Aug. 12, 1958     W. J. PATTERSON ET AL     2,846,717
FOWL HEAD HOLDING AND POSITIONING APPARATUS
Filed Feb. 15, 1955     3 Sheets-Sheet 1
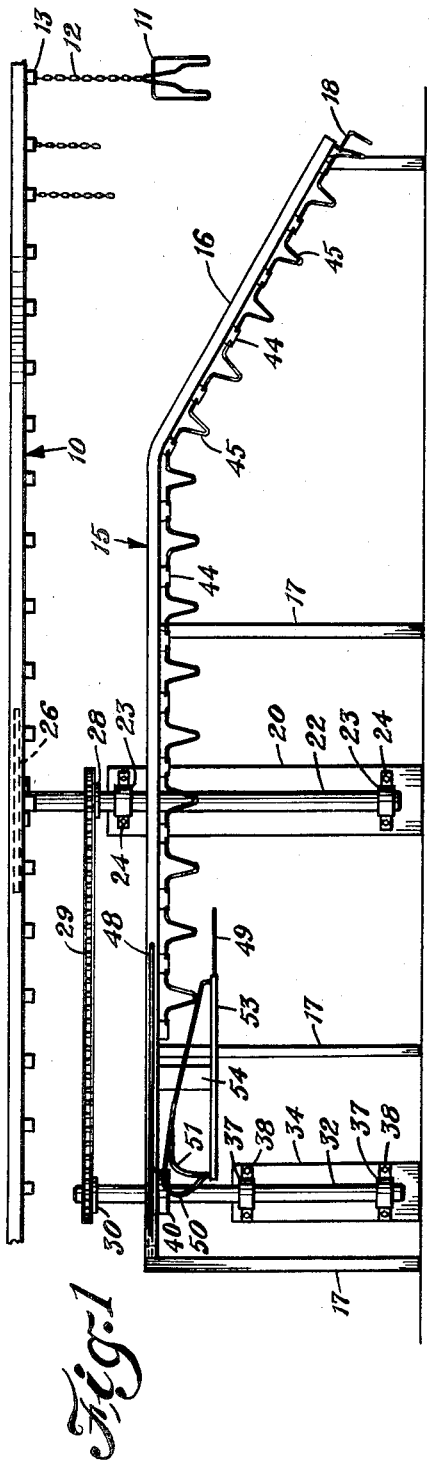
INVENTORS
WILLIAM J. PATTERSON
ERNEST HAASE
BY R. G. Story
ATTORNEY

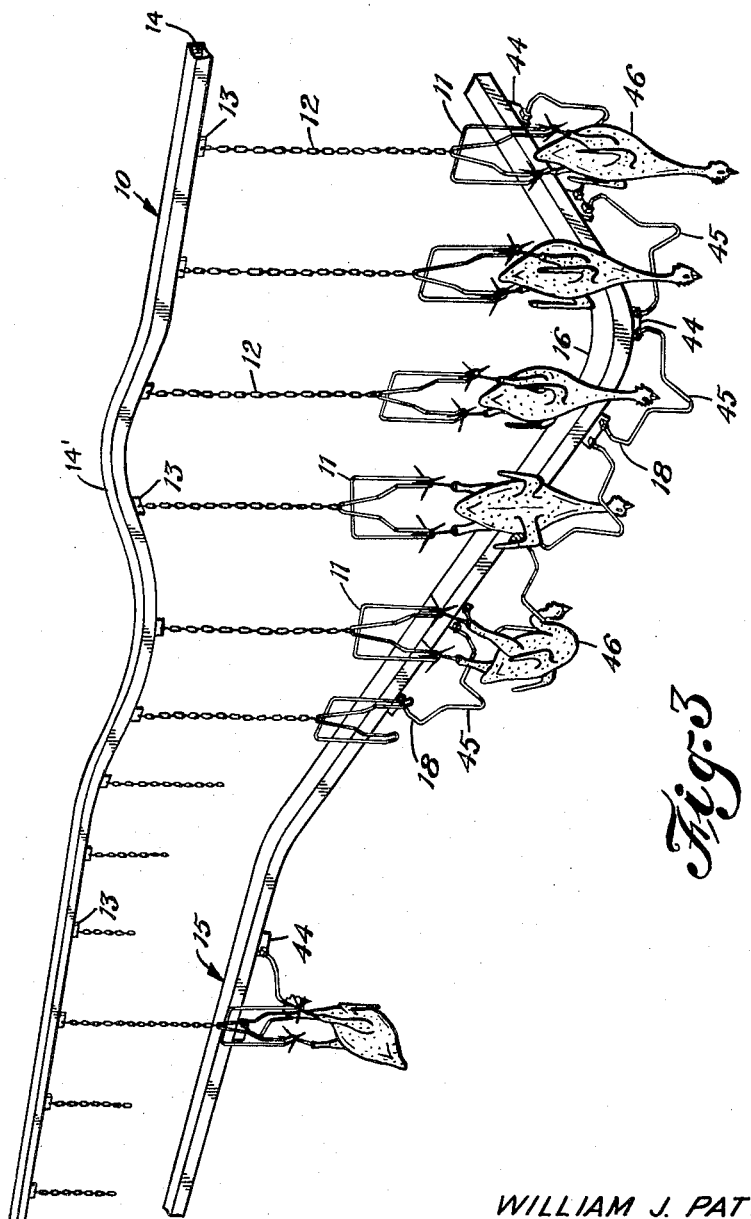

Aug. 12, 1958 W. J. PATTERSON ET AL 2,846,717
FOWL HEAD HOLDING AND POSITIONING APPARATUS
Filed Feb. 15, 1955 3 Sheets-Sheet 3

WILLIAM J. PATTERSON
ERNEST HAASE
INVENTORS

BY R. G. Story

ATTORNEY

United States Patent Office 2,846,717
Patented Aug. 12, 1958

2,846,717

FOWL HEAD HOLDING AND POSITIONING APPARATUS

William J. Patterson, La Grange, and Ernest H. Haase, Chicago, Ill., assignors to Swift & Company, Chicago, Ill., a corporation of Illinois Application February 15, 1955, Serial No. 488,194

11 Claims. (Cl. 17—11)

The present invention is directed generally toward a method and apparatus capable of positioning fowl for efficient defeathering operation. More specifically, the present invention relates to a method of positioning fowl for defeathering and apparatus capable of automatically and continuously engaging the heads of fowl to be defeathered, securely holding the heads and lifting the heads to properly position the bodies of the fowl for efficient defeathering, maintaining such a position until the defeathering operation is completed and automatically releasing the heads of the fowl in such a manner as to impart no damage to the fowl.

Various types of head lifters and droppers have been devised in an attempt to reduce the manual operation necessary in the defeathering of fowl. No completely automatic head lifter and dropper has been devised which will properly carry out the operation without damage to the fowl or result in incomplete defeathering. The problems confronting the development of suitable automatic apparatus are many. Not only is the automatic lifting and dropping of heads of fowl a complicated procedure, but such a procedure must be of a suitable nature so as to properly position the fowl, thereby allowing complete mechanical defeathering.

In processing fowl, the various operations are performed on a suspended bird which is normally free to rotate. Such an arrangement is desirable due to the various types of operations necessary in preparing the bird for market. However, free rotation does create a problem which is not easily overcome. It has been found necessary in the past to employ a number of operators to properly position the bird prior to the defeathering operation so as to realize efficient defeathering. The rotation of the bird must be controlled during this operation and normally in accomplishing this, the head of the bird is held and positioned in some manner to overcome the normally free rotation of the bird in its shackle. Present systems devised not only require operators to position the bird prior to defeathering, but also require further manual operation in releasing the bird from its defeathering position following defeathering and prior to subsequent processing.

It is therefore an object of the present invention to provide a method of positioning fowl for defeathering.

It is another object of the present invention to provide apparatus capable of automatically positioning fowl prior to the mechanical defeathering operation and automatically freeing the fowl from the positioning means following the defeathering operation.

It is further an object to automatically position fowl in such a manner as to realize the greatest possible efficiency from mechanical defeathering.

Still another object is to devise head lifting and dropping apparatus capable of use in conjunction with existing shackle conveyors.

A further object is to provide head holding means of simple construction and high efficiency.

Other objects not specifically set forth will become apparent from the following detailed description of the present invention.

It has been found that excellent defeathering results are obtained by positioning the bird with its head approximately adjacent its feet while suspended in an inverted position. In conventional defeathering operations, the defeathering apparatus consists of long flexible fingers which are operated to beat downwardly supplying the body of the bird with glancing blows to remove the feathers therefrom. Different methods have been used to position the bird so as to realize efficient defeathering, but the drooping of the wings, among other things, has caused difficulties which are not readily overcome. By utilizing the positioning of the bird as described in connection with the present invention, it has been found that the wings hang away from the shoulders of the bird and the downward moving defeathering fingers readily remove the feathers from the exposed spaces. At the same time, the bird is not rigidly held so as to be damaged by offering too much resistance to the action of the fingers. The wings are also positioned so as not to droop in a manner to cause the formation of hollow spaces in the body of the bird which are not readily reached by the defeathering fingers. It has been found that birds processed under conventional conditions, i. e., shackled and suspended by their feet can be easily placed into the position of the present invention by lifting their heads toward their feet either manually or by the use of suitable apparatus. The apparatus described as follows is merely one form of apparatus suitable for carrying out the method of the present invention.

In the drawings:

Figure 1 is a side elevation of the apparatus of the present invention showing a section of the overhead conveyor.

Figure 2 is a plan view of the embodiment of Figure 1 showing the path of travel of the overhead conveyor but not the conveyor.

Figure 3 is a partial isometric view of a part of the overhead conveyor and the conveyor of the head lifting and dropping apparatus.

Figure 4:
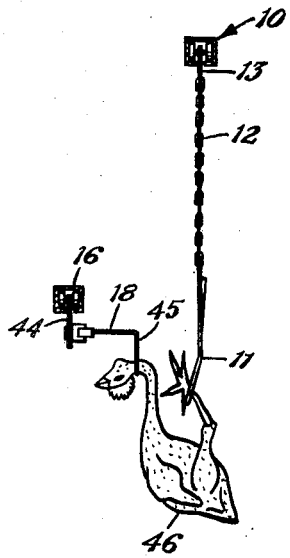
Figure 4 is a sectional view taken along the line 4—4 in Figure 2 illustrating the defeathering position of the fowl.

In Figures 1 and 2, a conventional overhead conveyor, generally 10 driven by suitable means not shown is illustrated in part to demonstrate its cooperation with the head lifting and dropping apparatus forming a part of the present invention. Attached to the conventional overhead conveyor 10 are shackles 11 which are carried by chains 12 attached to hangers 13. The hangers 13 move in channel 14 and in an undulating path 14'. Positioned directly below the overhead conveyor 10 is the head lifting and dropping apparatus 15. This apparatus includes a conveyor 16 of the endless variety describing a path of movement which approximates a rectangle as seen in Figure 2. The four ends of the conveyor 16 are rounded and the right end is depressed at an angle to the remainder of the conveyor as shown in Figure 1. The angle of depression is 30° in Figure 1, but it should be clear that any suitable angle can be utilized. Conveyor 16 is mounted on frame supports 17 to rise a sufficient distance from the floor. Mounted on the conveyor 16 are holding wires 18. These wires are in the form of hoops suitable for receiving the head and neck of the bird as will be subsequently described. The driving mechanism for operation of the conveyor 16 is mounted on a brace 20, the bottom portion of which is shown in Figure 2, which in turn is secured to the floor by bolts 21. A shaft 22 is supported by the brace 20 and housed in bearings 23. Bolts 24 secure bearings 23 to the brace 20. Mounted on the shaft 22 is a sprocket 26 a portion of which is cut away in Figure 2 to better show the remainder of the driving mechanism. Movement of the overhead conveyor 10 drives the sprocket 26 imparting rotation to the shaft 22. This rotation is in turn imparted to a sprocket 28 mounted on the shaft 22 at a distance slightly below the sprocket 26. The sprocket 28 is more clearly shown in the cut away view of Figure 2. Chain 29 is operatively connected to the sprocket 28 and in turn operates sprocket 30 which is mounted on shaft 32 which is supported on brace 34, the bottom portion of which is shown in Figure 2. Bolts 35 attach brace 34 to the floor, while bearings 37 form suitable housings for shaft 32. The bearings 37 are attached to brace 34 by bolts 38. Sprocket 40, more clearly seen in Figure 2, is mounted on shaft 32 and in turn cooperates with conveyor 16 to impart motion thereto. As can be seen from this type of arrangement, the movement of overhead conveyor 10 by suitable driving means not shown imparts synchronized movement to conveyor 16 by the driving arrangement previously described. In Figure 2, the movement of the overhead conveyor 10 in relation to the head lifting and dropping apparatus 15 is shown by the dotted line 42. The plan view of the overhead conveyor 10 is not present in Figure 2 to allow a clearer view of the head lifting and dropping apparatus 15. In following the dotted line 42, it can be seen that the overhead conveyor 10 follows an undulating path. Such an arrangement serves three purposes, the first of which is to compensate for the greater distance of travel of the conveyor 16 due to the depressed portion of the conveyor 16 as compared to the horizontal travel of the overhead conveyor 10. Such a compensation allows for the maintenance of proper timing between the two conveyors. The necessity of such timing and the remaining two functions of the undulating path of the overhead conveyor 10 can be described in connection with Figure 3.

In Figure 3, an isometric view of a portion of the apparatus is shown for the purpose of clearly demonstrating the manner in which the head lifting and dropping apparatus 15 automatically engages the heads and necks of the fowl as they are advanced by the overhead conveyor 10. Conveyor 10 is positioned generally above conveyor 16. As the birds advance, the lowermost and foremost portion of the head lifting and dropping apparatus 15 is positioned in such a manner as to allow the passing of the head and neck of each bird into a separate holding wire 18. As each holding wire 18 advances around the lower corner of the conveyor 16 and advances up the sloped portion of the conveyor, it is held at an angle adequate to allow the clearance of the bird's head over the sides of the wire. As the wire further advances up the incline and the overhead conveyor 10 maintains its level advance, the head and neck of the bird is encircled by the holding wire 18. Eventually the holding wire 18 rises to a sufficient height to lift the neck of the bird in V section 45 which is directed downwardly to substantially a right angle to the horizontal plane of the holding wire 18. The portion of channel 14 positioned above the sloped portion of conveyor 16 describes an undulating path 14' ensuring that conveyor 10 passes generally over conveyor 16 in this area. The first deviation of the direction of travel of the birds 46 as they are advanced by the overhead conveyor 10 ensures the movement of the bird directly over a holding wire 18. Upon the change of direction of the overhead conveyor 10, the bird 46 is moved outwardly to one side of the holding wire 18 to ensure the introduction of the neck of the bird into the V section 45 of the holding wire 18. This is the second function of the undulating path of overhead conveyor 10. As previously described, this deviation in the path of travel of the shackled birds 46 also compensates for the additional distance traveled by the holding wires 18 up the incline of the conveyor 16. As the birds 46 are moved to one side of the holding wires 18 and the latter approach the top of the incline, the neck of the bird is drawn securely into contact with the lowermost portion of the V section 45 of the holding wire 18. This is the third function of the undulating path of overhead conveyor 10. Upon the leveling off of the travel of the holding wire 18, the neck and head of the bird is positioned approximately adjacent its feet and the bird is in a position to be efficiently defeathered. A side view of this position is clearly shown in Figure 4 and it can be seen that the bird is securely held so as to supply adequate resistance to the defeathering apparatus and yet not be damaged by being inflexibly held. As also more clearly seen in Figure 4, the holding wires 18 are mounted on hangers 44 which in turn form a part of the conveyor 16 which is of conventional design. The particular manner in which the holding wires 18 are mounted to the hangers 44 will be more clearly described in connection with Figures 6 and 7.

Figure 5:
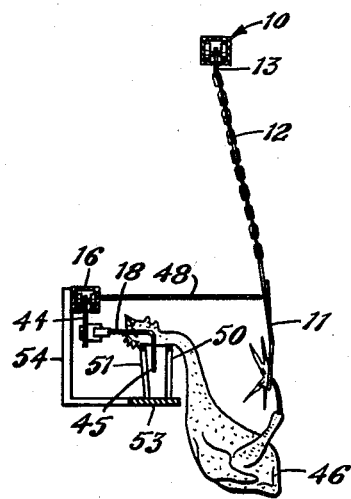
Figure 5 is a sectional view taken along the line 5—5 of Figure 2 illustrating the operation of the head dropping portion of the apparatus of the present invention.

Referring to Figure 5 and Figures 1 and 2, the means for automatically releasing the heads and necks of the birds from the holding wires 18 will be described. The releasing arrangement comprises wire 48 which is mounted on the frame of the head lifting and dropping apparatus 15 and extends outwardly as shown in Figure 2 beyond the frame. This wire contacts the shackle 11 and guides it to one side of the apparatus so as to pull the feet and body of the bird 46 to one side until the head and neck are ultimately freed from the holding wire 18. Wire 49 which is also mounted on the frame of the head lifting and dropping apparatus 15 is curved as shown in Figure 2 and cooperates with the body of the bird 46 to move the bird to one side of the head and neck releasing means. This latter means consists of wires 50 and 51 which are mounted on platforms 53 which in turn is supported by brace 54 suitably attached to the frame 17 of the head lifting and dropping apparatus 15. Wires 50 and 51 are mounted in such a manner as to allow the V section 45 of each holding wire 18 to pass between the wires. As can be seen in Figure 1, wires 50 and 51 are sloped so as to slowly raise the head and neck of the bird out of contact with the holding wire 18. Wire 50 presents a camming surface to the neck of the bird so as to raise it out of the V section 45. Wire 51 presents a camming surface to the head of the bird so as to cooperate with the camming action of wire 50. As the bird and holding wire 18 approaches the end of wires 50 and 51, the head and neck of the bird is sufficiently raised so as to allow it to swing free from the holding wire 18 as the latter begins to round the left foremost corner of the conveyor 16. For purposes of completely freeing the head and neck of the bird from the holding wire 18, wire 50 extends beyond wire 51 and at this point continues to rise until it is above the uppermost portion of the holding wire 18. The neck and head of the bird is thereby completely cleared of the holding wire 18 and further advancement of the bird by the overhead conveyor 10 allows the bird to swing clear of the head lifting and dropping apparatus 15. Thus latter step is further aided by the wire 48 which extends sufficiently to insure complete separation.

Figure 6:
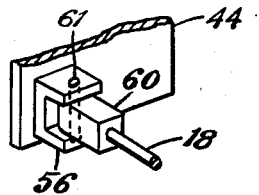
Figure 6 is a partial isometric view of the manner in which the head holding means are mounted.
Figure 7:
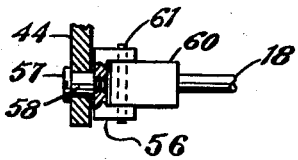
Figure 7 is a side view having portions in section further illustrating the mounting shown in Figure 6.

Due to the change of direction in travel of the holding wires 18, the manner in which they are mounted to the hangers 44 of the head lifting and dropping apparatus 15 is of importance. As can be seen in Figure 3, the ends of each holding wire 18 are mounted on different hangers 44, the foremost end of each holding wire 18 being attached to the same hanger as the hindmost end of an adjacent wire. In Figures 6 and 7, two different views of the mounting of an end of a wire to a hanger 44 are shown. Figure 6 is an isometric view showing the hanger 44 in section having attached thereto a clevis 56 receiving the wire end 60 which in turn is rotatably fixed to the clevis 56 by pin 61. As can be seen in this view, each end of each holding wire 18 is mounted to allow a slight rotation around its vertical axis. This type of mounting facilitates the turning of the corners present in the head lifting and dropping apparatus 15. In Figure 7, the clevis 56 is shown mounted to the hanger 44 by screw 57 extending through collar 58 which is housed in the hanger 44. The presence of the collar 58 allows clearance between the bottom surface of the clevis 56 and the top surface of the hanger 44. As a result, each end of each holding wire 18 can be rotated at least slightly around its horizontal axis. Such an arrangement allows compensation for the change in direction of the holding wire as it begins the ascent up the incline of the head lifting and dropping apparatus 15 and levels off to a horizontal path of travel from the same incline.

In considering the above description, it is apparent that the apparatus of the present invention is of relatively simple construction and would not require extensive maintenance. This apparatus is also fully automatic and the operation of the head lifting and dropping portion is synchronized with the movement of the overhead conveyor in such a manner as to require only simple adjustment. As can also be seen, the birds are gently handled and there is little possibility of subsequent damage. Suitable defeathering apparatus can be positioned adjacent the head lifting and dropping apparatus to defeather the birds once they are properly positioned.

Obviously, many modifications and variations of the invention as hereinbefore set forth may be made without departing from the spirit and scope thereof, and therefore only such limitations should be imposed as are indicated in the appended claims.

We claim:

1. A device suitable for use in positioning shackled fowl during the defeathering of the fowl, said device including a frame, a conveyor on said frame, means connected to said conveyor for moving said conveyor along a predetermined path, head holding means on said conveyor, said head holding means including a hoop having a V section extending downwardly to receive the necks of shackled fowl, and releasing means on said frame at a point along the path of movement of said conveyor to remove the heads and necks of the shackled fowl from said head holding means, said releasing means including a first and second camming means, said first camming means positioned behind the V section of said hoop and under the main portion of said hoop to raise the heads of the fowl substantially near the top portion of said V section and said second camming means positioned in front of the V section of said hoop to raise the necks of the fowl out of said V section, said second camming means extending beyond and rising above said first camming means to ultimately move the necks and heads of the fowl out of association with said hoop.

2. A device suitable for use in positioning shackled fowl during the defeathering of the fowl, said device including a frame, a conveyor on said frame describing an enclosed path of travel, said conveyor having a portion thereof along said path of travel depressed at an angle to the remainder thereof, head holding means on said conveyor to automatically receive the heads and necks of shackled fowl during upward movement along said depressed portion of said path of travel, said head holding means including a hoop having a V section extending downwardly to receive the necks of shackled fowl, and releasing means on said frame to remove the heads and necks of the shackled fowl from said head holding means, said releasing means including a first and second camming means, said first camming means positioned behind the V section of said hoop and under the main portion of said hoop to raise the heads of the fowl substantially near the top portion of said V section and said second camming means positioned in front of the V section of said hoop to raise the necks of the fowl out of said V section, said second camming means extending beyond and rising above said first camming means to ultimately move the necks and heads of the fowl out of association with said hoop.

3. A device for use in the processing of fowl having head and leg extremities, said device comprising: a pair of shackles each having an extremity engaging means; means operatively associated with one of said shackles to move said one shackle in a fixed path; and means operatively associated with the other shackle to move said other shackle in an undulating path with respect to said one shackle, whereby a fowl suspended by one extremity from said other shackle may have the other extremity engaged in the extremity engaging means of said one shackle during said movements.

4. A device for use in the processing of fowl having head and leg extremities, said device comprising: a pair of shackles each having an extremity engaging means, said engaging means of one of said shackles having an open side, said open side being upwardly; means operatively associated with said one shackle to move said one shackle in a fixed path; and means operatively associated with the other shackle to move said other shackle in an undulating path with respect to said one shackle, whereby a fowl suspended by one extremity from said other shackle may have the other extremity engaged in the extremity engaging means of said one shackle during said movements.

5. A device for use in the processing of fowl having head and leg extremities, said device comprising: a pair of shackles each having an extremity engaging means, said engaging means of one of said shackles having an open side, said open side being upwardly; means operatively associated with said one shackle to move said one shackle in a fixed path; and means operatively associated with the other shackle to move said other shackle in an undulating path with respect to said one shackle, whereby a fowl suspended by one extremity from said other shackle may have the other extremity engaged in the extremity engaging means of said one shackle during said movements, and means operatively associated with said one shackle to disengage said other extremity from the engaging means of said one shackle.

6. A device for use in the processing of fowl having head and leg extremities, said device comprising: a pair of shackles each having an extremity engaging means, said engaging means of one of said shackles being generally V-shaped and having an open top; means operatively associated with said one shackle to move said one shackle in a fixed path; and means operatively associated with the other shackle to move said other shackle in an undulating path with respect to said one shackle, whereby a fowl suspended by one extremity from said other shackle may have the other extremity engaged in the extremity engaging means of said one shackle during said movements.

7. A device for use in the processing of animals having at least two extremities, said device comprising: a first endless conveyor trained for movement about a first closed path; a second endless conveyor trained for movement about a second closed path, said conveyors being positioned so that a portion of said first conveyor is generally above a portion of said second conveyor; means associated with said conveyors to move said first conveyor in an undulating path over said second conveyor along said portion; a shackle operatively associated with said first conveyor and having an extremity engaging means, a second shackle operatively associated with said second conveyor and having an extremity engaging means; and power means operatively associated with said conveyors to move said shackles in the same general direction along said portion.

8. A device for use in the processing of animals having at least two extremities, said device comprising: a first endless conveyor trained for movement about a first closed path; a second endless conveyor trained for movement about a second closed path, said conveyors being positioned so that a portion of said first conveyor is generally above a portion of said second conveyor; means associated with said conveyors to move said first conveyor in an undulating path over said second conveyor along said portion; a shackle operatively associated with said first conveyor and having an extremity engaging means; a second shackle operatively associated with said second conveyor and having an open top, generally V-shaped, extremity engaging means; and power means operatively associated with said conveyors to move said shackles in the same general direction along said portion.

9. A device for use in the processing of animals having at least two extremities, said device comprising: a first endless conveyor trained for movement about a first closed path; a second endless conveyor trained for movement about a second closed path, said conveyors being positioned so that a portion of said first conveyor is generally above a portion of said second conveyor; means associated with said conveyors to move said first conveyor in an undulating path over said second conveyor along said portion; a shackle operatively associated with said first conveyor and having an extremity engaging means; a second shackle operatively associated with second conveyor, said second shackle including a hoop having a V section extending downwardly; and power means operatively associated with said conveyors to move said shackles in the same general direction along said portion.

10. A device for use in the processing of animals having at least two extremities, said device comprising: a first endless conveyor trained for movement about a first closed path; a second endless conveyor trained for movement about a second closed path, said conveyors being positioned so that a portion of said first conveyor is generally above a portion of said second conveyor; means associated with said conveyors to move said first conveyor in an undulating path over said second conveyor along said portion; a shackle operatively associated with said first conveyor and having an extremity engaging means; a second shackle operatively associated with said second conveyor and having an open top, generally V-shaped, extremity engaging means; and power means operatively associated with said conveyors to move said shackles in the same general direction along said portion whereby an animal suspended by an extremity from the shackle of the first conveyor may have the other extremity hooked in said V-shaped engaging means as said animal moves along said undulating path; and means associated with said second conveyor along a part of said second path beyond, in said direction, said undulating path of said first conveyor to move said other extremity and said V-shaped engaging means vertically and sideways with respect to each other in a direction such that said other extremity will be disengaged from said engaging means.

11. A device for use in the processing of animals having at least two extremities, said device comprising: a first endless conveyor trained for movement about a first closed path; a second endless conveyor trained for movement about a second closed path, said conveyors being positioned so that a portion of said first conveyor is generally above a portion of said second conveyor; means associated with said conveyors to move said first conveyor in an undulating path over said second conveyor along said portion; a shackle operatively associated with said first conveyor and having an extremity engaging means; a second shackle operatively associated with said second conveyor and having an open top, generally V-shaped, extremity engaging means; and power means operatively associated with said conveyors to move said shackles in the same general direction along said portion whereby an animal suspended by an extremity from the shackle of the first conveyor may have the other extremity hooked in said V-shaped engaging means as said animal moves along said undulating path; and means associated with said second conveyor along a part of said second path beyond, in said direction, said undulating path of said first conveyor to move said other extremity and said V-shaped engaging means vertically and sideways with respect to each other in a direction such that said other extremity will be disengaged from said engaging means, said last, disengaging means including a pair of cams positioned at opposite sides of said V-shaped engaging means and extending upwardly from a point below the bottom of said V, the cam on one side of said engaging means extending upwardly in said direction more rapidly than the cam one the other side of said engaging means.

References Cited in the file of this patent

UNITED STATES PATENTS

| | | |
|---|---|---|
| 2,557,707 | Utter | June 19, 1951 |
| 2,667,660 | Lentz et al. | Feb. 2, 1954 |
| 2,700,792 | Adams et al. | Feb. 1, 1955 |
| 2,714,223 | Lentz et al. | Aug. 2, 1955 |